June 18, 1935.  H. KREBS  2,005,089

VALVE

Filed Dec. 31, 1932

Inventor
HENRY KREBS.
By
Attorney

UNITED STATES PATENT OFFICE 2,005,089

VALVE SPRING

Henry Krebs, Detroit, Mich., assignor to Packard Motor Car Company, Detroit, Mich., a corporation of Michigan Application December 31, 1932, Serial No. 649,697

11 Claims. (Cl. 267—1)

This invention relates to devices for preventing surging of coil springs and more particularly to coil springs employed with valves.

Engine poppet valves are usually held closed by coil springs and are opened by mechanism actuated by a moving engine part, such as a cam. It is recognized that such valve springs surge at certain engine speeds, depending on the characteristics of the wire and other factors, with the result that the contemplated valve timing is changed. In addition, surging will cause the coils to strike against each other so that noise develops and fatigue occurs prematurely.

As a means of damping spring surging, it has been proposed to employ a metal cap which is placed over one end of such springs and has resilient fingers frictionally engaging one or two of the intermediate coils. While this arrangement has some damping effect, still it leaves the coils which are not engaged free to surge and, furthermore, the frictional contact of the fingers with the wire results in undesirable noise.

It is an object of my invention to provide a valve operating structure in which surging of the coil spring is substantially eliminated.

Another object of my invention is to provide a surge damping device for engaging a coil spring which is of a character such that there will be no friction resulting from the contact.

A further object of the invention is to provide a spring structure for a valve in which the adjacent coils are prevented from contacting, under any operating condition by resilient means.

Still another object of this invention is to provide a valve closing device in which rubber means is employed with a coil spring to prevent surging thereof.

Other objects of the invention will appear from the following description taken in connection with the drawing, which forms a part of this specification, and in which.

Figure 1:
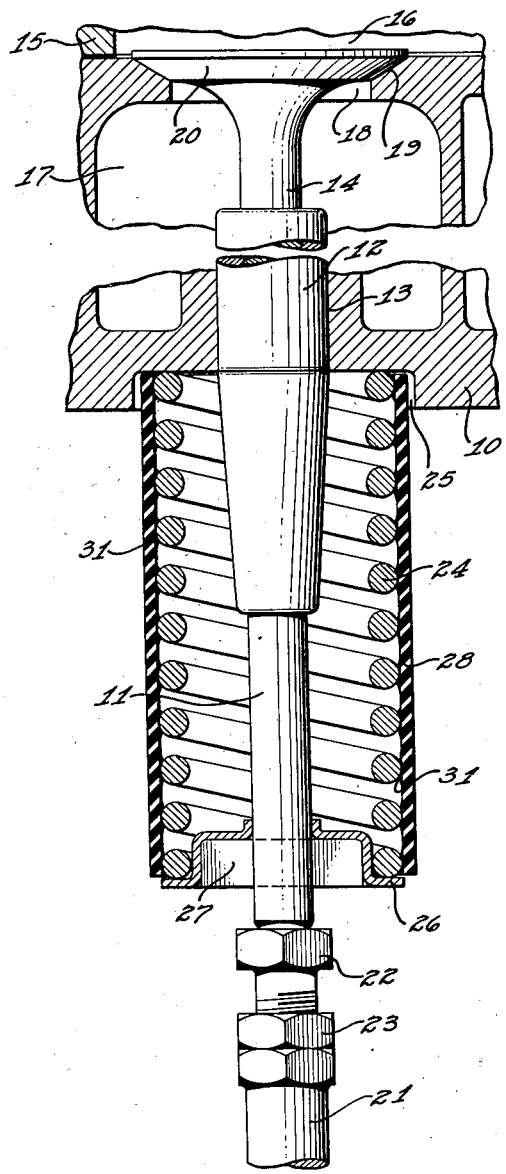
Fig. 1 is a fragmentary sectional view of an internal combustion engine showing my invention associated with a valve in its closed position.
Figure 2:
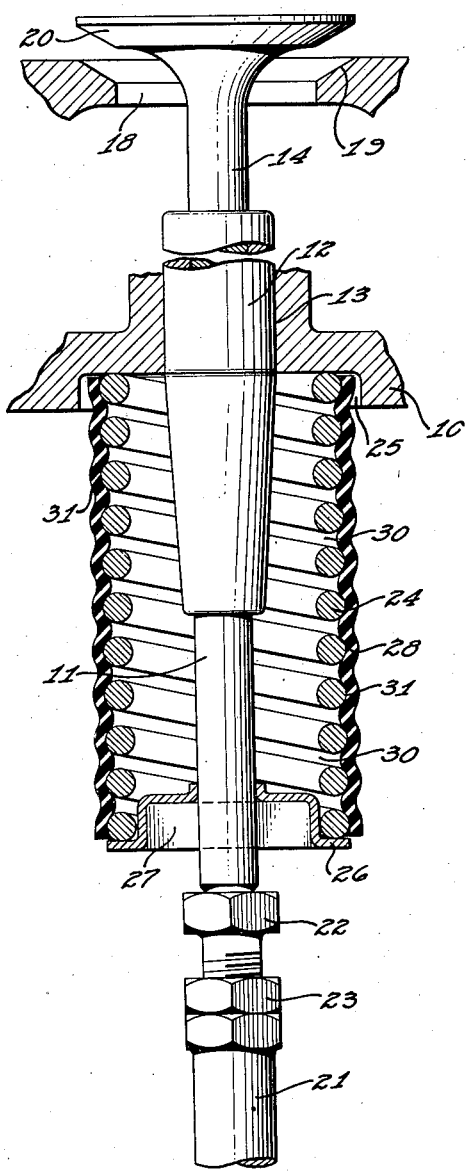
Fig. 2 is a similar view showing the valve in open position.

Referring now to the drawing by characters of reference, 10 indicates a stationary element, such as the cylinder block of an internal combustion engine, with which is associated a reciprocating element 11, such as a poppet valve. A bearing sleeve 12 is fitted into an opening 13 in the cylinder block and a valve stem 14 is arranged to reciprocate in the sleeve.

On the cylinder block is fixed a head block 15 within which is a combustion chamber 16. A fuel inlet or exhaust outlet manifold 17, within the cylinder block, is connected with the combustion chamber by means of a port 18 which terminates at one end in a beveled face 19 providing a seat for the valve head 20.

Associated with the end of the valve stem is a tappet 21 having an adjustable contact member 22 on the end thereof and a lock member 23 for securing the contact member in desired adjusted position. The tappet is actuated in a conventional manner by an engine operated, rotating element (not shown) so that when the tappet is moved toward the seat 19, the valve head will be unseated to allow communication between the manifold 17 and the combustion chamber.

Means is provided for returning the valve from open to seated position and, in this instance, such means is in the form of a coil wire spring 24 having one end seated in a recess 25 in the cylinder block and the other end engaging a retainer 26 which seats against a key 27 passing through the stem. The spring is initially compressed so that its normal tendency is to exert pressure against the retainer in a direction to maintain the valve in seated position.

Under certain speeds of valve reciprocation, surging of the spring will occur unless some damping means is provided. In order to prevent surge, I associate stabilizing means with the spring so that the coils will be maintained in spaced relation during any frequency of valve reciprocation. Such stabilizing means is preferably of a resilient character and is associated with each coil of the spring throughout its length in order to obtain the best results. As illustrated, the stabilizing means is in the form of a rubber sleeve 28 which is coextensive with the spring and permanently fixed thereto along the length of the wire by vulcanizing, as indicated at 31.

The sleeve can be fixed to the spring in either stretched or unstretched condition. With the sleeve associated with the spring in unstretched condition, opening movement of the valve will compress the spring and such compression is resisted by the sleeve due to the resilient quality thereof and the portions of the sleeve between the coils are bent inwardly forming a spirally extending pad as indicated at 30. The sleeve thus tends to resist relative movement of the coils and at the same time provides a cushion therebetween so that the usual dance of the coils, which occurs with different frequency at certain speeds of valve reciprocation, will be damped and the coil movement will be stabilized. The sleeve also serves to prevent undue movement of the coils relatively when the spring is moving the valve toward closing position and thus aids in stabilizing the action. Due to the material of which the sleeve is formed there will be no contact friction which will cause noise during operation of the valve mechanism.

With the sleeve vulcanized to the spring in a stretched or loaded condition, surge damping of the spring occurs because of the internal stress developed in the rubber during valve reciprocation.

Through the provision of stabilizing means of the character described, spring surging is substantially eliminated and spring life is materially prolonged.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a high frequency valve operating structure, the combination with a coil spring for normally seating a valve, of resilient means restraining surge movements of the several coils of the spring relatively in high frequency operation.

2. In a valve operating structure, the combination with a loaded coil spring, of means associated with each coil of the spring to dampen surge occurring in high frequency operation.

3. In a valve operating structure, the combination with a loaded coil spring, of a resilient sleeve telescoping with the spring and fixed under tension to the peripheral surface of the coils.

4. In a valve operating structure, the combination with a coil spring, of a relatively thick rubber sleeve telescoping with the spring and secured to the peripheral surface of the spring throughout its length.

5. In a valve operating structure, the combination with a coil spring, of a rubber sleeve closely telescoping with the spring and fixed to the peripheral surface thereof in a relation to fill the spaces between the coils when the spring is compressed.

6. In a valve operating structure, the combination with a coil spring, of rubber means around the spring and fixed thereto in a relation whereby the internal stress of the rubber will dampen surging.

7. In a reciprocating structure having a stationary element and a reciprocable element, a coil spring associated to urge the reciprocating element in one direction, and stabilizing means associated with the spring throughout its length for damping surge developing at high speed operation.

8. In a high frequency engine valve operating structure, the combination of a coil spring arranged to urge the valve in one direction, and a resilient sleeve telescoping with the coil spring and secured thereto along the peripheral surface thereof for damping spring surge developing at high frequency operation.

9. In an internal combustion engine, a valve and means for imparting reciprocating movements of high frequency to the valve, comprising a coil spring for moving the valve in one direction and resilient means secured to and flexibly connecting the coils of the spring to damp the surges thereof.

10. In an internal combustion engine a valve and means for imparting reciprocating movements of high frequency to the valve, comprising a coil spring for moving the valve in one direction and rubber stabilizing means arranged by its yielding resilient action, to damp the surges of the spring.

11. In an internal combustion engine a valve and means for imparting reciprocating movements of high frequency to the valve comprising a coil spring for moving the valve in one direction and resilient, flexible, non-metallic stabilizing means arranged by its resistance to distortion, to damp the surges of the spring.

HENRY KREBS.